United States Patent [19]

Houtsager

[11] 3,887,066

[45] June 3, 1975

[54] AUTOMATIC BOARD TURNER

[75] Inventor: Hendrik Houtsager, Beaverton, Oreg.

[73] Assignee: Moore Dry Kiln Company of Oregon, Portland, Oreg.

[22] Filed: July 20, 1973

[21] Appl. No.: 380,997

[52] U.S. Cl. .................. 198/285; 198/34; 198/283; 214/1 QD
[51] Int. Cl. ............................................ B65g 47/24
[58] Field of Search....... 198/33 AD, 282, 283, 285, 198/284, 34; 214/1 Q, 1 QD

[56] References Cited
UNITED STATES PATENTS

| | | | |
|---|---|---|---|
| 3,074,530 | 1/1963 | Rosenleaf...................... | 198/33 AD |
| 3,247,963 | 4/1966 | Fehely........................... | 198/33 AD |
| 3,306,427 | 2/1967 | Spencer........................ | 198/33 AD |
| 3,426,882 | 2/1969 | Korth............................ | 198/33 AD |

Primary Examiner—Evon C. Blunk
Assistant Examiner—Jeffrey V. Nase
Attorney, Agent, or Firm—Chernoff & Vilhauer

[57] ABSTRACT

Apparatus for automatically inverting boards for inspection as they advance transversely at spaced intervals along a conveyor. The conveyor is of the type having spaced sets of projecting lugs thereon, and a speed-up belt traveling in the same direction but at greater speed overlies the conveyor and urges the leading edge of each board into abutment with the back of a respective lug set. The board turner comprises a pair of horizontally-spaced rotatable shafts mounted transversely above the conveyor, each shaft having groups of transversely-spaced arms fixed perpendicularly thereto for intersecting the plane of the conveyor at the bottom of their arcuate paths, the respective groups of arms being separated radially from one another on the respective shafts. The shafts are both coupled for synchronous motion with the conveyor lug chain so as to cause a depending group of arms from a respective shaft to intersect the plane of the conveyor at a point in travel immediately ahead of a set of advancing lugs, the direction of shaft rotation being such that the depending arms move in the same direction as the lugs at such point of intersection. The lugs on the conveyor have a greater linear speed than the tips of the depending arms, permitting the set of lugs to catch up to the arms and transfer the leading edge engagement of a respective board to the arms which then lift the leading edge with an upward arcuate movement tending to tip the board over. The speed-up belt, which travels at a linear speed substantially greater than either the lugs or the arms, maintains the engagement between the board and the arms until the board has been completely inverted, at which point the belt causes the board to accelerate forwardly relative to the conveyor into leading edge engagement once more with the respective lug set. The two rotatable shafts are spaced horizontally apart, along the line of travel, and turn at the same speed with a gear reduction such that their respective depending groups of arms intersect the conveyor plane coincident with alternate sets of advancing lugs, thereby enabling the respective groups of arms to invert opposite sets of alternate boards.

16 Claims, 8 Drawing Figures

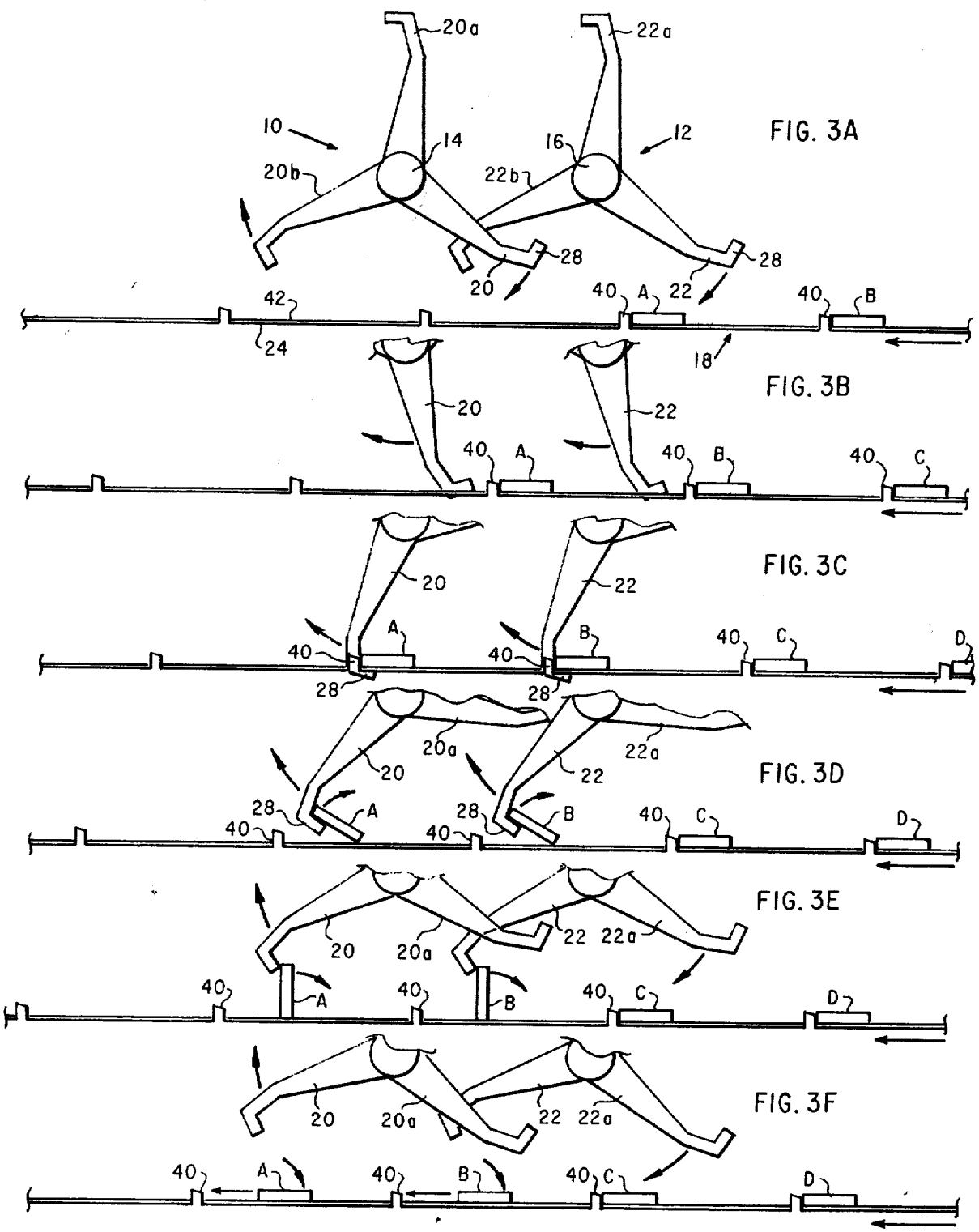

AUTOMATIC BOARD TURNER

BACKGROUND OF THE INVENTION

This invention relates to improvements in automatic board turning apparatus especially adaptable for use on the outfeed side of a lumber planer for enabling a grader operator to inspect both sides of boards as they travel by on a horizontal conveyor. More specifically, the board turning apparatus is of the type having rotary arms driven in synchronization with a lugged conveyor chain for lifting the front edge of each board transversely advancing along the conveyor and tipping it over backwardly.

In automatic board turning equipment of the type known to the art and shown for example in Spencer U.S. Pat. No. 3,306,427 and Fehely U.S. Pat. No. 3,247,963, powered arms are employed for engaging the underside of boards as they advance along a conveyor and inverting them with a forwardly rotating motion which, although effective, is not particularly smooth nor gentle especially when applied to large boards. Moreover such prior art systems usually turn each and every board at one location along the line of travel of the conveyor. Since a grader operator will normally be assigned the task of observing both sides of the boards at the work station location where they are inverted, the speed of the conveyor utilizing such systems must typically be limited to approximately 30 boards per minute since the operator would find it extremely difficult to accurately inspect and grade any larger volumetric rate of boards. At least one system is known, however, which features two board turning stations each inverting alternate boards.

Another prior art type of automatic board turning apparatus is shown in Rosenleaf U.S. Pat. No. 3,074,530 in which a group of transversely-spaced pendulum arms are provided for engaging the leading edges of respective boards or panels advancing along a conveyor. Since the arms are free swinging rather than being coupled to the conveyor for synchronous operation, the arms must swing back to a vertical position after each board is turned, raising the possibility that the arms may strike and damage a board on the return motion. Accordingly, retarding means in the form of a counterweight or dashpot must be provided in this prior art design to guard against this possibility which, in turn, limits the speed at which the board turner can be operated. In addition, every inverted board is turned at one station along the line of travel of the conveyor which again limits the number of boards per minute which can feasibly be inspected while transported on the conveyor.

SUMMARY OF THE PRESENT INVENTION

The present invention is directed to an automatic board turning apparatus of the general type described in which respective groups of rotatable arms spaced transversely above a lugged conveyor are driven in sychronization therewith so as to intersect the plane of the conveyor at locations immediately ahead of respective sets of advancing lugs, the direction of arm movement being the same as that of the lugs at the place of intersection. The synchronous motion causes each group of depending arms to engage the leading edge of a respective board advancing transversely along the conveyor behind a set of lugs and lift the leading edge with an upward arcuate movement tending to tip the board over backwardly. A speed-up belt overlying the conveyor and traveling in the same direction but at a greater linear speed than either the lugs or the arms frictionally maintains the engagement between the board and the arms until the board has been completely inverted, at which point the belt accelerates the inverted board forwardly relative to the conveyor into leading edge engagement once again with the lug set. Some of the groups of arms are mounted to a common rotatable shaft driven in synchronization with the conveyor lug chain and mounted transversely above the conveyor, while other groups are mounted on a different shaft spaced horizontally apart from the first shaft along the line of travel of the conveyor. The shafts have appropriate gear reduction and spacing relative to the lugged conveyor such that the respective groups of arms on the separate shafts invert different intermingled sets of regularly spaced boards at different locations along the line of travel of the conveyor.

The provision of depending board turner arms driven unidirectionally in synchronization with the conveyor so as to engage and lift the leading edges of advancing boards and thereby invert them enables the boards to be turned with an exceptionally smooth yet rapid motion which minimizes the possibility of impact damage to the boards while maximizing the speed with which the boards can be automatically inverted. In addition, the provision of multiple groups of such board turner arms spaced horizontally in the direction of travel of the conveyor at different board turning stations, and synchronized with the conveyor and positioned so that such groups of arms engage and invert different intermingled sets of regularly spaced boards, permits the employment of multiple graders working at different stations along a single conveyor and enables the production rate of the conveyor to be multiplied, within reasonable limits, by the number of different board-turning stations without diminishing the accuracy of the grading.

Accordingly it is a primary objective of the present invention to provide an automatic board turning apparatus for smoothly and rapidly lifting boards by their leading edges and inverting them backwardly for inspection as they advance transversely along a conveyor, said apparatus being driven unidirectionally in synchronization with the conveyor.

It is a further objective of the present invention to provide multiple board-turning stations along the line of travel of a single conveyor for turning different intermingled sets of regularly spaced boards, enabling the employment of multiple graders along the conveyor and thereby increasing the production rate of the conveyor significantly.

The foregoing objectives, features and advantages of the present invention will be more readily understood upon consideration of the following detailed description of the invention taken in conjunction with the accompanying drawings.

BRIEF DESCRIPTION OF THE DRAWINGS

FIGS. 3A–F are schematic diagrams depicting the interaction of boards on a conveyor relative to a pair of board turning arm assemblies in accordance with the operation of the present invention.

DESCRIPTION OF THE PREFERRED EMBODIMENT

Figure 1:
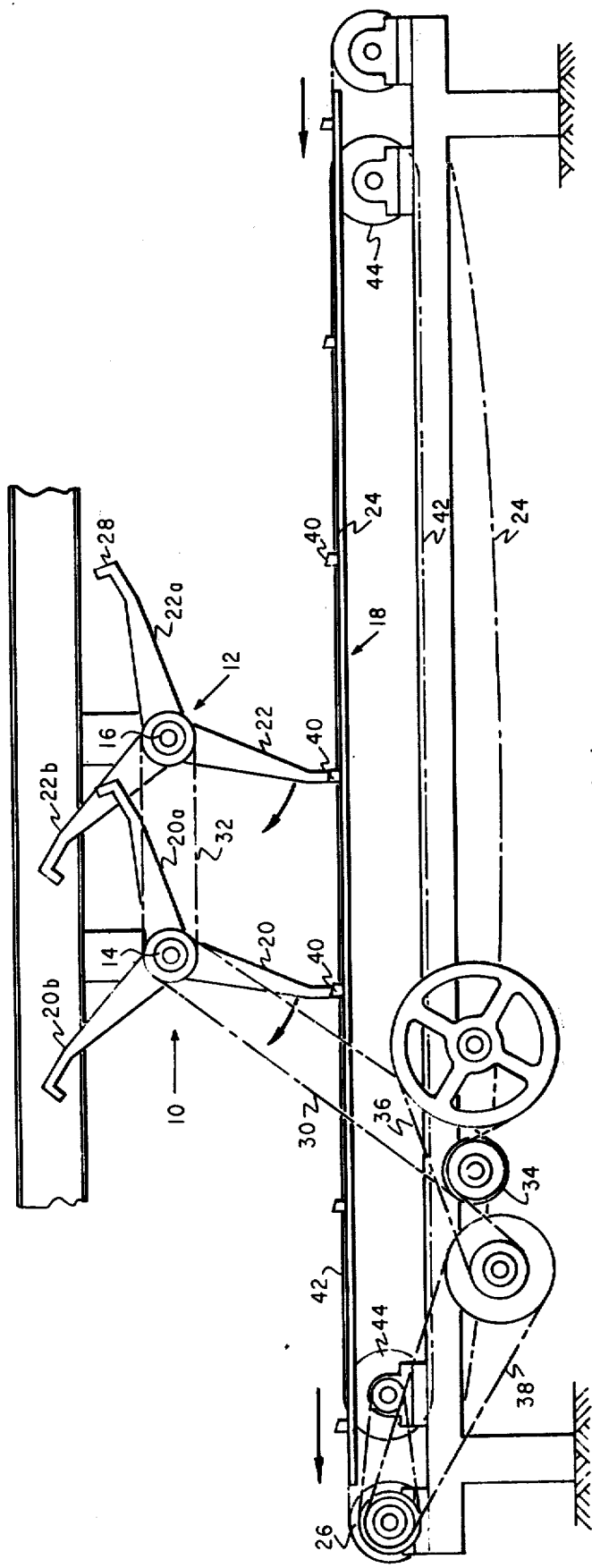
FIG. 1 is a simplified side elevation view showing a rotatable pair of board turning arm assemblies mounted above a lugged conveyor equipped with an overlying speed-up belt.

The board turning apparatus comprises two rotating arm assemblies designated generally as 10 and 12 respectively in FIG. 1. Each assembly 10 and 12 includes a respective shaft 14 and 16, each journaled for rotation about an axis above and transverse to the direction of travel of a lugged conveyor 18 and each having transversely spaced and aligned groups of protruding arms such as 20, 22 affixed thereto. Preferably each shaft includes three such groups 20, 20a, 20b and 22, 22a and 22b respectively, the three groups being radially spaced 120° apart.

Figure 2:
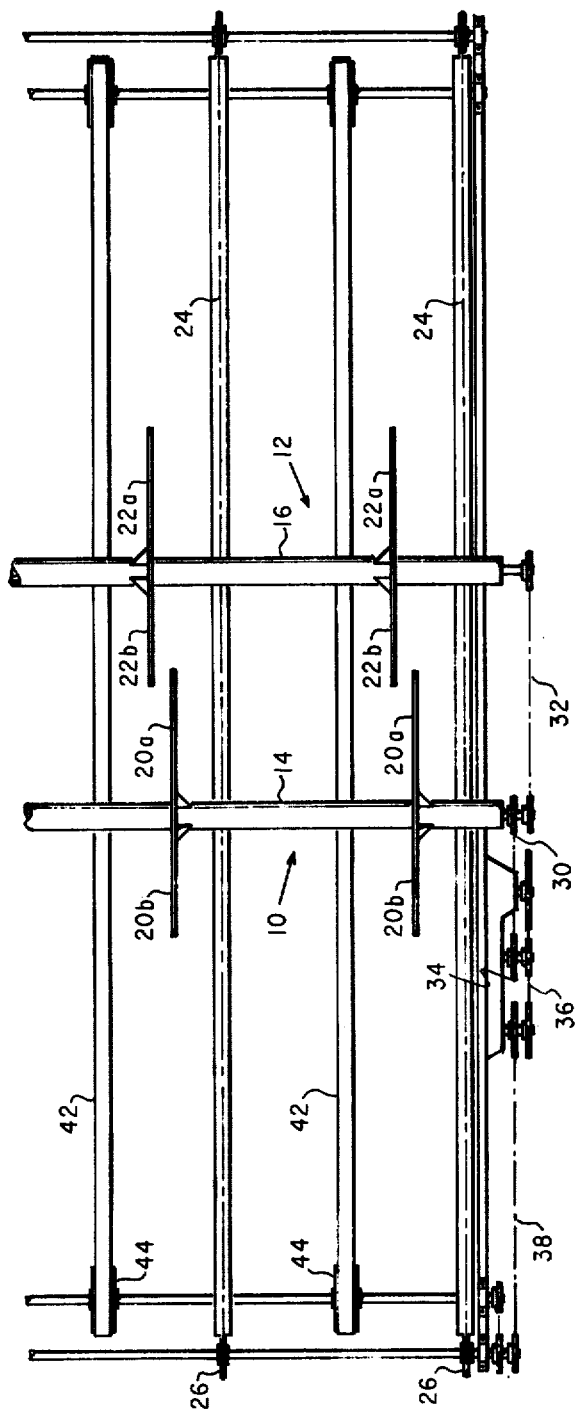
FIG. 2 is a partial, simplified top view of the conveyor and arm assemblies.

The shafts 14, 16 are each mounted at a height above the conveyor 18 such that their respective arms intersect the horizontal plane defined by the top of the conveyor when the arms rotate through the bottom portions of their arcuate paths. Such intersection is made possible by the fact that the conveyor 18 is composed of transversely spaced lug chains 24 driven in unison by sprockets 26 mounted on one end of the conveyor, the transverse spaces between the lug chains 24 as shown in FIG. 2 permitting placement of the arms between the chains. Since the respective shafts 14 and 16 are positioned sufficiently close to one another that their respective arms travel through overlapping arcs, the arms of one shaft are transversely offset from the arms of the other shaft as shown in FIG. 2 so as to avoid any interference between the arm assemblies.

The pair of arm assemblies are rotated in unison by drive means which include chains 30 and 32 interconnected by appropriate drive sprockets. The drive chain 30 receives its power from sprocket 34 which is in turn interconnected by chains 36 and 38 with the sprockets 26 which drive the lugged conveyor 18. This interconnection between the conveyor and the arm assemblies synchronizes their respective motions and insures that the direction of rotation of the arm assemblies will be such that the arms travel substantially in the same direction as the conveyor 18 (i.e. from right to left in FIG. 1) when the arms are at the bottom of their respective arcuate paths.

The synchronizing assembly comprising chains 30, 32, 36 and 38 and their respective interconnecting sprockets performs several important functions. First it synchronizes the speed of the arms with the speed of the conveyor 18 so that the respective arms will arrive at their board engaging positions (the positions of arms 20 and 22 in FIG. 1) in a predetermined relation to respective boards on the conveyor so as to cause the desired engagement between the boards and the arms to occur. In the preferred embodiment of FIG. 1, the conveyor 18 is of the type having regularly spaced sets of projecting lugs 40 for engaging and positioning the leading edges of respective boards advancing transversely along the conveyor. Accordingly each arm is required to arrive at its board engaging position substantially coincidentally with a set of lugs 40. Proper initial rotational adjustment and sizing of the various interconnecting sprockets, adapting the arms to rotate through an angle of 120° in the same period of time required for the conveyor to travel a distance equal to a desired lug spacing, satisfies this requirement.

Another purpose of the synchronizing assembly is to insure that the linear speed of the arm tips is less than the linear speed of the conveyor 18. This permits the use of rearwardly facing hook members such as 28 on the tips of the respective arms adaptable to engage a board beneath its leading edge and tip the board backwardly in a manner to be described hereafter in greater detail. To effect such engagement the arms must intersect the plane of the conveyor 18 ahead of the leading edges of the respective boards and the conveyor must then have a linear speed sufficiently greater than that of the arm tips to cause the boards to catch up to the respective tips and overlap the trailing hook members.

A further function of the synchronizing assembly is to enable the utilization of multiple arm assemblies 10 and 12 horizontally spaced along the direction of travel of the conveyor 18 for engaging and inverting different intermingled sets of regularly spaced boards, thereby permitting the employment of a separate grader at each board turning location. Assuming that a normal grader has the capability for accurately grading boards at the rate of approximately 30 per minute, the use of two graders each stationed at a different board turning location along the conveyor and each inspecting different sets of boards as they are turned, permits the conveyor to run at the speed of 60 boards per minute, doubling its normal productivity. The function of the synchronizing assembly in accomplishing this purpose is to insure that each of the arm assemblies 10 and 12 respectively turn opposite intermingled sets of alternate boards as they pass by. Thus the rotational speed of the two shafts 14 and 16 respectively must be such that the shafts turn through an angle of 120° in the same period of time required for the conveyor to travel a distance equal to two lug intervals. By way of contrast, if such high conveyor production rate were not required in a particular application and if therefore only one arm assembly were used in conjunction with the conveyor 18, the shaft would be synchronized to turn through an angle of 120° contemporaneously with the conveyor's advancing by a single lug interval so that the arm assembly could invert every board passing by. In the latter case, the lug spacing might have to be increased relative to arm length to insure that the conveyor 18 would still have a linear speed sufficiently greater than that of the arm tips.

In the preferred embodiment, the two arm assemblies 10 and 12 are separated horizontally a distance equal to one lug interval, and turn in unison so that their respective arms reach their board engaging positions simultaneously. These features, together with the aforementioned synchronization, insure that the set of alternate boards engaged by arm assembly 12 will be opposite to the intermingled set of alternate boards engaged by arm assembly 10. The same result would occur if the two arm assemblies 10 and 12 respectively were spaced apart a distance equal to an odd multiple other than one of the lug intervals. Thus the arm assemblies, in addition to inverting the boards, automatically segregate the boards to be inspected by the respective graders into opposite alternating sets. Without such segregation, a pair of graders stationed along the line of travel of the conveyor would encounter extreme difficulty in visually separating the boards to be inspected by one grader from those to be inspected by the other, with the result that some boards would be inspected twice and others not at all.

The operation of the board turning apparatus may be more readily understood with reference to FIGS. 3A through 3F wherein the progression of a series of boards past the board turning assemblies 10 and 12 is illustrated. In FIG. 3A two adjacent boards A and B separated by one lug interval are shown advancing transversely along conveyor 18 moving from right to left. The leading edges of the two boards are frictionally urged into engagement with the rear faces of the respective lugs 40 by transversely spaced sets of speed-up belts 42 overlying the plane of the conveyor 18 and driven by pulleys 44 (FIGS. 1 and 2) in the same direction but at a greater linear speed than either the lugs 40 or the hook members 28 mounted on the tips of the respective arms. The first board A belongs to a set of spaced alternate boards intended to be inverted by the arm assembly 10, and therefore the synchronized motion of the conveyor and the arms causes it to pass by the arm assembly 12 while the arm 22 is still too far above the conveyor 18 to effect board engagement. In FIG. 3B the respective arms 20 and 22 have intersected the conveyor at a point ahead of the boards A and B respectively in preparation for engaging them. In FIG. 3C the two arms have reached their board engaging positions, and the conveyor 18 by virtue of its linear speed being greater than that of the hook members 28 has caused each of the boards to catch up with and overlap a respective hook member 28 so as to effect engagement. In FIG. 3D leading edge engagement of the boards A and B has been transferred from the respective lugs 40 to the respective hook members 28 which begin to lift the leading edges of the boards A and B tending to tip them backwardly as the arms 20 and 22 rotate forwardly and upwardly from the conveyor 18. During this motion the speed-up belts 42, by virtue of their sliding frictional engagement with the lower rear portions of the respective boards, maintain the boards in engagement with the respective hook members 28 until the arms 20, 22 have rotated upwardly to the positions shown in FIG. 3E. At this point each board is about to tip backwardly into an inverted position on the conveyor 18, and the motion of the speed-up belts 42 promotes the inversion. In FIG. 3F the boards A and B have been completely inverted and are being accelerated forwardly by the speed-up belts 42 once more into leading edge engagement with their respective sets of lugs 40 so as to properly position the boards for further handling. In the meantime another board C, belonging to the same set of alternate boards as board A, is passing by arm assembly 12 and advancing toward engagement with arm 20a of arm assembly 10. Likewise a board D, belonging to the same set of alternate boards as board B, is advancing toward engagement with arm 22a of arm assembly 12. Accordingly, two intermingled sets of alternately spaced boards corresponding to set A, C, E, G. etc. and B, D, F, H etc. will continue to be inverted separately by the respective arm assemblies 10 and 12 in the same manner described for boards A and B, enabling one grader to visually distinguish and inspect one such set while another grader visually distinguishes and inspects the other set.

It is conceivable that a third arm assembly could be added, for example spaced one lug interval to the opposite side of arm assembly 12 along the line of travel of the conveyor, with the arm drive synchronization being such that each arm assembly inverts different intermingled sets of boards spaced three lug intervals apart. This would enable the employment of three graders and permit a conveyor speed of approximately 90 boards per minute. More than three arm assemblies might be possible, the primary limitation being the maximum practicable conveyor speed.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of advancing boards transversely at spaced intervals and automatically inverting said boards to permit inspection of both sides thereof, said method comprising:
   a. advancing said boards on a conveyor having respective projecting lugs regularly spaced along its line of travel for engaging and positioning the leading edges of said respective boards;
   b. rotating an arm about an axis positioned above and transverse to the direction of travel of said conveyor, said arm being adaptable when depending from said axis adjacent the bottom of its arcuate path to engage the leading edge of a respective one of said advancing boards and lift said edge with a tipping motion tending to invert said board backwardly away from a respective lug as said arm rotates forwardly and upwardly; and
   c. frictionally urging said board forward on said conveyor by means of a speed-up belt underlying said conveyor and traveling in the same direction but at a greater linear speed than said lugs, thereby maintaining the engagement between said board and said arm until said board has been completely inverted and thereafter accelerating said inverted board forwardly into engagement with said respective lug.

2. The method of claim 1 wherein said step (b) includes unidirectionally rotating said arm about said axis of rotation such that said arm moves substantially in the same direction as said conveyor at the bottom of said arm's arcuate path, further including the step of synchronizing the rotation of said arm with the movement of said conveyor thereby causing said arm to arrive at said board engaging position coincident with said respective lug.

3. The method of claim 1 wherein said arm includes a rearwardly facing member adaptable to engage said board beneath its leading edge and thereby lift said edge as said arm is rotated upward away from said conveyor, further including the step of synchronizing the rotation of said arm with the movement of said conveyor thereby causing said arm to arrive at said board engaging position immediately ahead of the leading edge of said respective board and causing the linear speed of said rearwardly facing member to be less than the linear speed of said conveyor so as to enable said conveyor to move said board into engagement with said member.

4. Board turning apparatus for automatically inverting boards as they advance transversely at spaced intervals along a conveyor, said board turning apparatus including an arm mounted for rotational movement about an axis positioned above and transverse to the direction of travel of said conveyor, said arm being adaptable when positioned adjacent the bottom of its arcuate path to engage the leading edge of a respective one of said advancing boards and lift said leading edge with a tipping motion tending to invert said board backwardly as said arm rotates upwardly, wherein the improvement comprises: drive means for unidirectionally rotating said arm about said axis of rotation in a direction such that said arm moves substantially in the same direction as said conveyor at the bottom of said arm's arcuate path; synchronizing means coupling said drive means to said conveyor for causing said arm to arrive at said board engaging position adjacent the bottom of its arcuate path immediately ahead of the leading edge of said respective board; a rearwardly facing member on said arm adaptable to engage said board beneath its leading edge and thereby lift said edge as said arm is rotated upwardly away from said conveyor by said drive means; said synchronizing means further including means for causing the linear speed of said rearwardly facing member to be less than the linear speed of said conveyor so as to enable said conveyor to move said board into engagement with said rearwardly facing member; spaced sets of projecting lugs on said conveyor for engaging and positioning the leading edges of said respective boards at spaced intervals along said conveyor; and a speed up belt overlying said conveyor and traveling in the same direction but at a greater linear speed than either said lugs or said rearwardly facing member for frictionally urging the leading edges of said respective boards against the rear faces of said lugs, said speed up belt serving also to maintain the engagement between said respective board and said rearwardly facing member until said board has been completely inverted.

5. The board turning apparatus of claim 4 including multiple ones of said arms spaced radially about said axis of rotation for engaging different ones of said respective boards advancing along said conveyor.

6. The board turning apparatus of claim 4 including a pair of said arms, each rotatably mounted about different axes of rotation spaced horizontally apart at different locations along the line of travel of said conveyor, said synchronizing means including means for causing said arms to engage different intermingled sets of said advancing boards at said different locations, each said set comprising regularly spaced boards.

7. The board turning apparatus of claim 4 comprising multiple board turning assemblies, each including at least one of said arms, positioned at different locations spaced along the line of travel of said conveyor and each adaptable for inverting respective ones of said advancing boards at said different locations, said synchronizing means being coupled to said respective board turning assemblies and including means for causing each of said board turning assemblies to invert different intermingled sets of said advancing boards, each said set comprising regularly spaced boards.

8. The board turning apparatus of claim 7 wherein a pair of said board turning assemblies are provided spaced apart a distance equal to an odd multiple of the interval spacing between corresponding portions of adjacent boards advancing along said conveyor, said synchronizing means including means for causing said pair of board turning assemblies simultaneously to invert opposite sets of alternate boards as they pass by said board turning assemblies.

9. The board turning apparatus of claim 8 wherein said pair of board turning assemblies are spaced a distance apart equal to one said interval spacing, whereby said pair of board turning assemblies simultaneously invert separate pairs of adjacent boards advancing along said conveyor.

10. Apparatus for advancing boards transversely at spaced intervals and automatically inverting said boards to permit inspection of both sides thereof, said apparatus comprising:
   a. a conveyor for advancing said boards, said conveyor having respective projecting lugs regularly spaced along its line of travel for engaging and positioning the leading edges of said respective boards;
   b. an arm mounted for rotational movement about an axis positioned above and transverse to the direction of travel of said conveyor, said arm being adaptable when depending from said axis adjacent the bottom of its arcuate path to engage the leading edge of a respective one of said advancing boards and lift said edge with a tipping motion tending to invert said board backwardly away from a respective lug as said arm rotates forwardly and upwardly; and
   c. a speed-up belt overlying said conveyor traveling in the same direction but at a greater linear speed than said lugs for frictionally urging said board forward, said speed-up belt being adaptable to maintain the engagement between said board and said arm until said board has been completely inverted, and being further adaptable thereafter to accelerate said inverted board forwardly into engagement with said respective lug.

11. The apparatus of claim 10 including drive means for unidirectionally rotating said arm about said axis of rotation such that said arm moves substantially in the same direction as said conveyor at the bottom of said arm's arcuate path, and synchronizing means coupling said drive means to said lugged conveyor for causing said arm to arrive at said board engaging position coincident with said respective lug.

12. The apparatus of claim 11 including multiple ones of said arms spaced radially about said axis of rotation, said synchronizing means including means for causing each said arm to arrive at its board engaging position coincident with a different respective lug.

13. The apparatus of claim 11 including a pair of said arms, each rotatably mounted about different axes of rotation spaced horizontally apart at different locations along the line travel of said conveyor, said synchronizing means including means for causing said arms to arrive at their respective board engaging positions coincident with different intermingled sets of said respective lugs.

14. The apparatus of claim 11 comprising multiple board turning assemblies, each including at least one of said arms, positioned at different locations spaced along the line of travel of said conveyor, said synchronizing means being coupled to said respective board turning assemblies and including means for causing said board turning assemblies to arrive at their respective board engaging positions coincident with different intermingled sets of said respective lugs.

15. The apparatus of claim 14 wherein a pair of said board turning assemblies are provided spaced apart a distance equal to an odd multiple of the interval spacing between adjacent lugs on said conveyor, said synchronizing means including means for causing said pair of board turning assemblies to arrive at their respective board engaging positions simultaneously coincident with alternate ones of said lugs.

16. The apparatus of claim 15 wherein said pair of board turning assemblies are spaced a distance apart equal to one said lug interval spacing.

* * * * *